(12) United States Patent
Hsieh

(10) Patent No.: US 6,765,150 B2
(45) Date of Patent: Jul. 20, 2004

(54) SIGNAL TRANSMISSION CABLE STRUCTURE

(76) Inventor: Angus Hsieh, No. 2, Tzchiang 2nd Rd., Jungli City, Taoyuan Hsien (TW)

( * ) Notice: Subject to any disclaimer, the term of this patent is extended or adjusted under 35 U.S.C. 154(b) by 0 days.

(21) Appl. No.: 10/212,272

(22) Filed: Aug. 6, 2002

(65) Prior Publication Data

US 2004/0026114 A1 Feb. 12, 2004

(51) Int. Cl.[7] .............................................. H01B 7/06
(52) U.S. Cl. ........................... 174/117 F; 174/117 FF; 174/36
(58) Field of Search ....................... 174/117 F, 117 FF, 174/36

(56) References Cited

U.S. PATENT DOCUMENTS 5,036,121 A * 7/1991 Coaker et al. ............... 524/100

FOREIGN PATENT DOCUMENTS

JP          407326241a      * 12/1995

* cited by examiner

Primary Examiner—Dean A. Reichard
Assistant Examiner—Jinhee Lee
(74) Attorney, Agent, or Firm—Browdy and Neimark, P.L.L.C.

(57) ABSTRACT

A signal transmission cable, formed in a flat and flexible shape, comprises an insulating body as outmost layer of the signal transmission cable. A woven fabric layer is arranged within the insulating body. A tin foil is arranged within the woven fabric layer. Two signal lines are encapsulated within the tin foil, and two power lines are placed within the insulating body. The signal lines and the power lines respectively are covered with an insulating layer. The signal transmission cable therefore constructed is easily wound and reduces the fabrication cost.

8 Claims, 5 Drawing Sheets

SIGNAL TRANSMISSION CABLE STRUCTURE

BACKGROUND OF THE INVENTION

1. Field of the Invention

The invention relates to a signal transmission cable structure and, more particularly, to a signal transmission cable formed in flat and flexible shape.

2. Description of the Related Art

A signal transmission cable is conventionally used to connect, for example, a telephone handset or different computer components.

FIG. 1 and FIG. 2 are respectively a perspective view and a cross-sectional view showing a conventional signal transmission cable. As shown, a conventional signal transmission cable 1a is usually cylindrical, and comprises an insulating body 10a, a woven fabric layer 11a, a tin foil 12a, a nylon thread 13a, a ground line 19a, an insulating layer 18a, two signal lines 14a, 15a and two power lines 16a, 17a. The insulating body 10a is made of PVC having good insulating properties, and is the outmost layer of the signal transmission cable 1a. The woven fabric layer 11a is placed within the insulating body 10a, and acts as anti-interference protection. The ground lines 19 and the tin foil 12a are placed within the insulating layer 10a. The ground lines 19a are placed between the tin foil 12a and the woven fabric layer 10a. Within the tin foil 10a is further arranged the nylon thread 13a to improve the flexibility of the signal transmission cable 1a. The two signal lines 14a, 15a and the two power lines 16a, 17a within the nylon thread 13a and the two signal lines 14a, 15a are together encapsulated within the insulating layer 18a to prevent interference. In application, a terminal end of the signal transmission cable 1a is connected to a signal plug 2a.

Although the above conventional signal transmission cable has good signal transmission results, its outer shape however is cylindrical and occupies a substantial space when being wound. The conventional signal transmission cable cannot be therefore conveniently received in a device body and need an external receiving member. If the user carries outdoor the electronic device to which the conventional signal transmission cable is connected, the user further needs to take with him/her several additional connecting lines which connection is time-consuming. The additional connecting lines further take substantial occupation space and may be lost. If the signal transmission cable is outwardly laid on a flat surface, the resulting protrusion of the cable is not aesthetic and further may easily causes a walking person to stumble. Moreover, with a cylindrical outer shape, the different lines within the cable are separated with a relatively small spacing distance, which easily causes interference. Because bending of the cylindrical cable may further negatively affects the signal transmission, the nylon thread is therefore traditionally needed to increase the flexibility of the cable, which increases the fabrication cost.

SUMMARY OF THE INVENTION

It is therefore a principal object of the invention to provide a structure of signal transmission cable that is formed in a flat and flexible shape, which enables easy winding in a cable-receiving case, prevents interference between the different lines within the cable, does not protrude when laid on a flat surface, and reduces the occupation space when received within a device body.

It is another object of the invention to provide a structure of signal transmission cable which construction does not need a nylon thread to have a good flexibility, which reduces the manufacturing cost.

To accomplish the above and other objectives, a signal transmission cable of the invention, formed in a flat and flexible shape, comprises an insulating body as outmost layer of the signal transmission cable. A woven fabric layer is arranged within the insulating body. A tin foil is arranged within the woven fabric layer. Two signal lines are encapsulated within the tin foil, and two power lines are placed within the insulating body. The signal lines and the power lines respectively are covered with an insulating layer.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
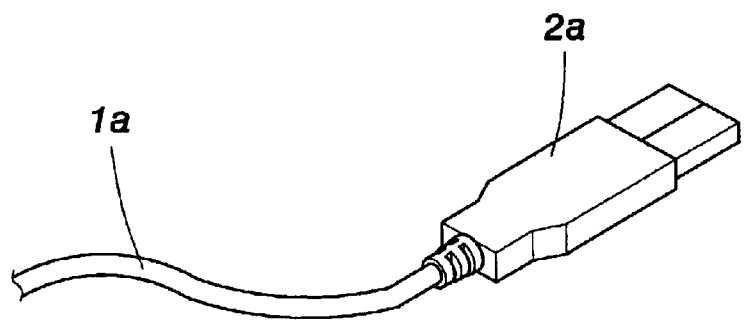
FIG. 1 is a perspective view schematically illustrating an application of a conventional signal transmission cable.
Figure 2:
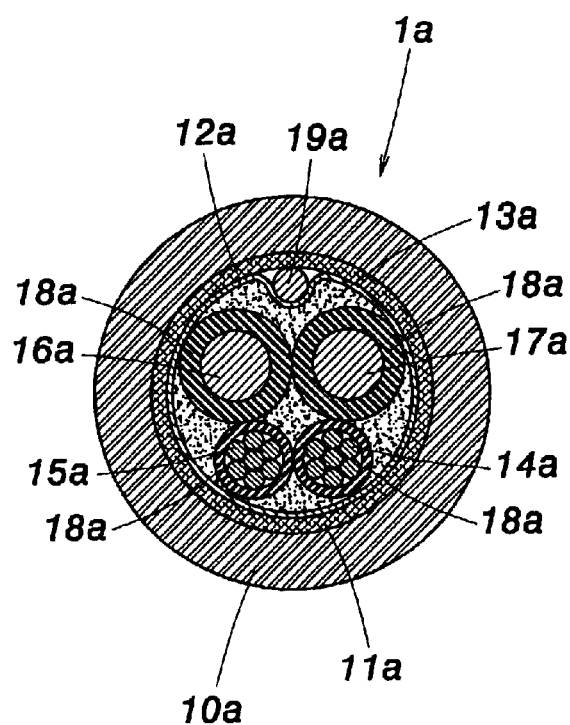
FIG. 2 is a cross-sectional view of a conventional signal transmission cable.

Wherever possible in the following description, like reference numerals will refer to like elements and parts unless otherwise illustrated.

Figure 3:
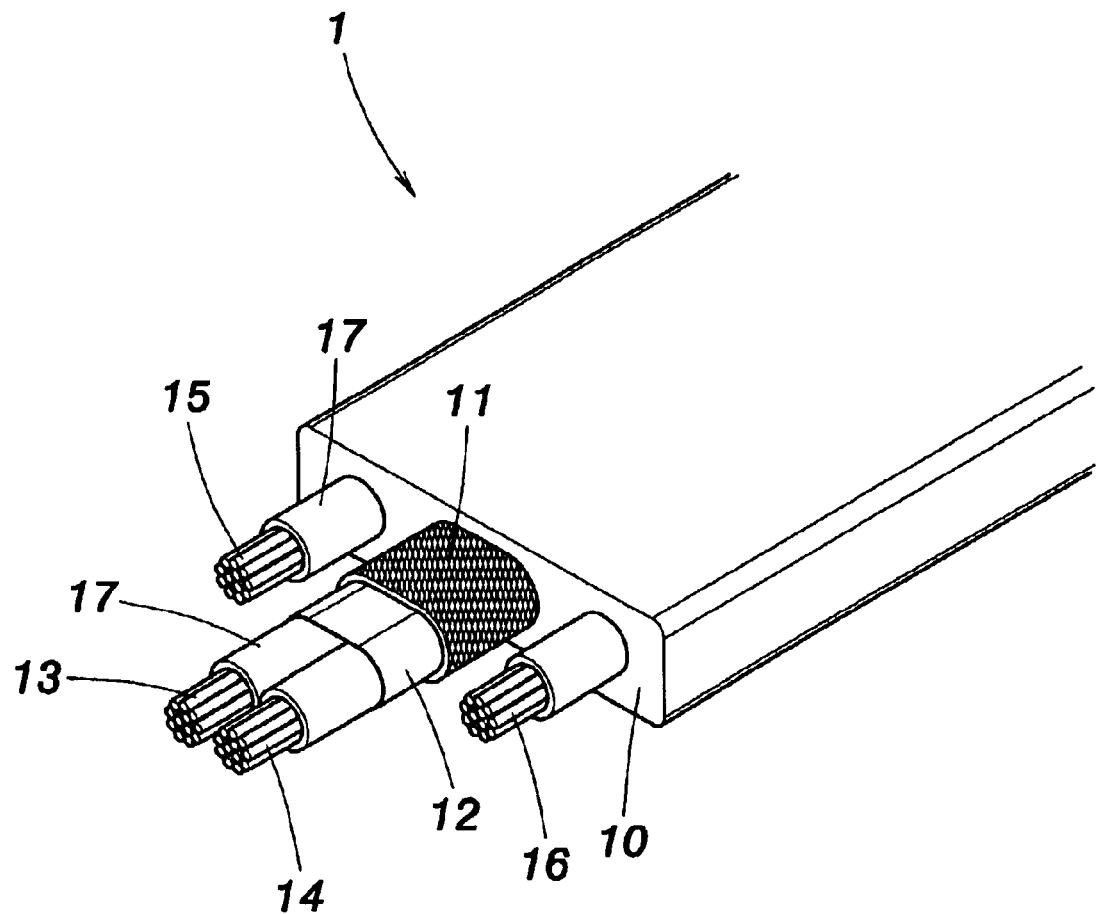
FIG. 3 is an outer perspective view of a signal transmission cable according to an embodiment of the invention.
Figure 4:
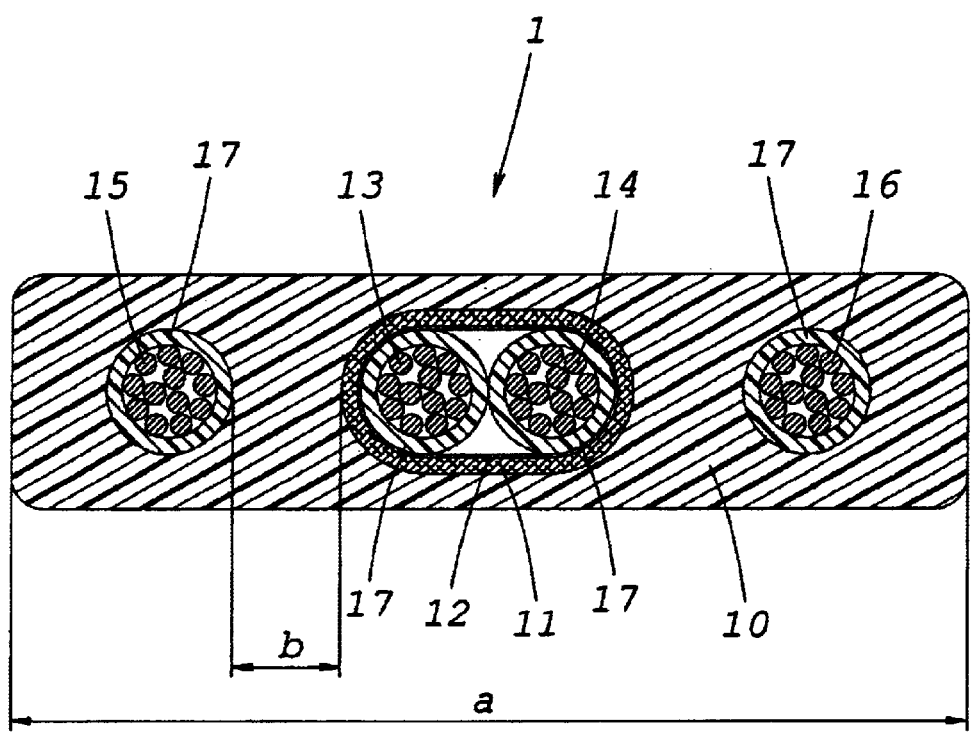
FIG. 4 is a cross-sectional view of a signal transmission cable according to a first embodiment of the invention.

Referring to FIG. 3 and FIG. 4, a perspective view and a cross-sectional view schematically illustrate a structure of signal transmission cable according to a first embodiment of the invention. As shown, a signal transmission cable comprises an insulating body 10, a woven fabric layer 11, a tin foil 12, two signal lines 13, 14 and two power lines 15, 16. The insulating body 10 is the outmost layer of the cable 1, and is made of polyvinylchloride having good thermosetting properties. Within the insulating body 10 is arranged the woven fabric layer 11 acting as anti-interference protection. Within the woven fabric layer 11 is arranged the tin foil 12 that encapsulates the two signal lines 13, 14. Around the periphery of signal lines 13, 14 is respectively arranged an insulating layer 17 made of foam polyethyl having good thermosetting properties. At the periphery of the insulating layers 17 is located the tin foil 12. The two power lines 15, 16 are also respectively covered with an insulating layer 17, and are placed at two sides of the woven fabric layer 11. The spacing distance between each of the power lines 15, 16 and the woven fabric layer 11 is about 0.2 to 0.9 mm. The signal transmission cable 1 is formed in a flat and flexible shape having a width a of about 4.5 to 8 mm.

Figure 5:
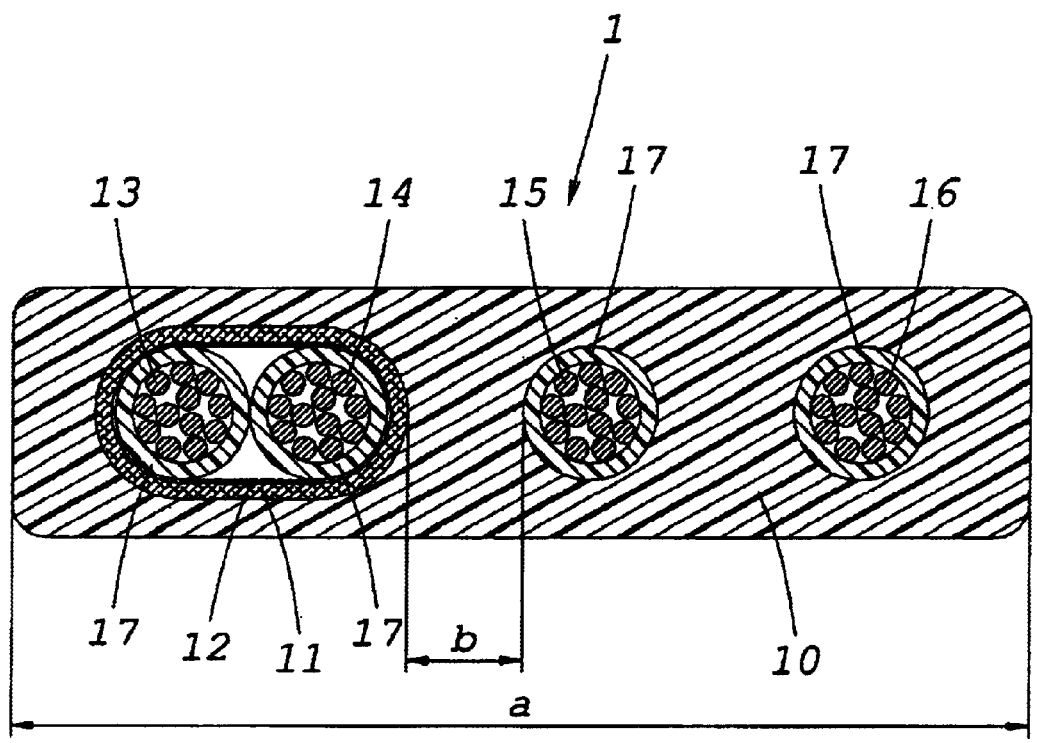
FIG. 5 is a cross-sectional view of a signal transmission cable according to a second embodiment of the invention.

Referring to FIG. 5, a cross-sectional view schematically illustrates a cable structure according to a second embodiment of the invention. The two power lines 15, 16 may be alternatively placed at a same side of the woven fabric layer 11. The power line 15, located at an inner side, is separated from the woven fabric layer 11 via a spacing distance b of about 0.2 to 0.9 mm. Other remaining parts and elements are similar to those of the first embodiment and their description is therefore omitted.

Figure 6:
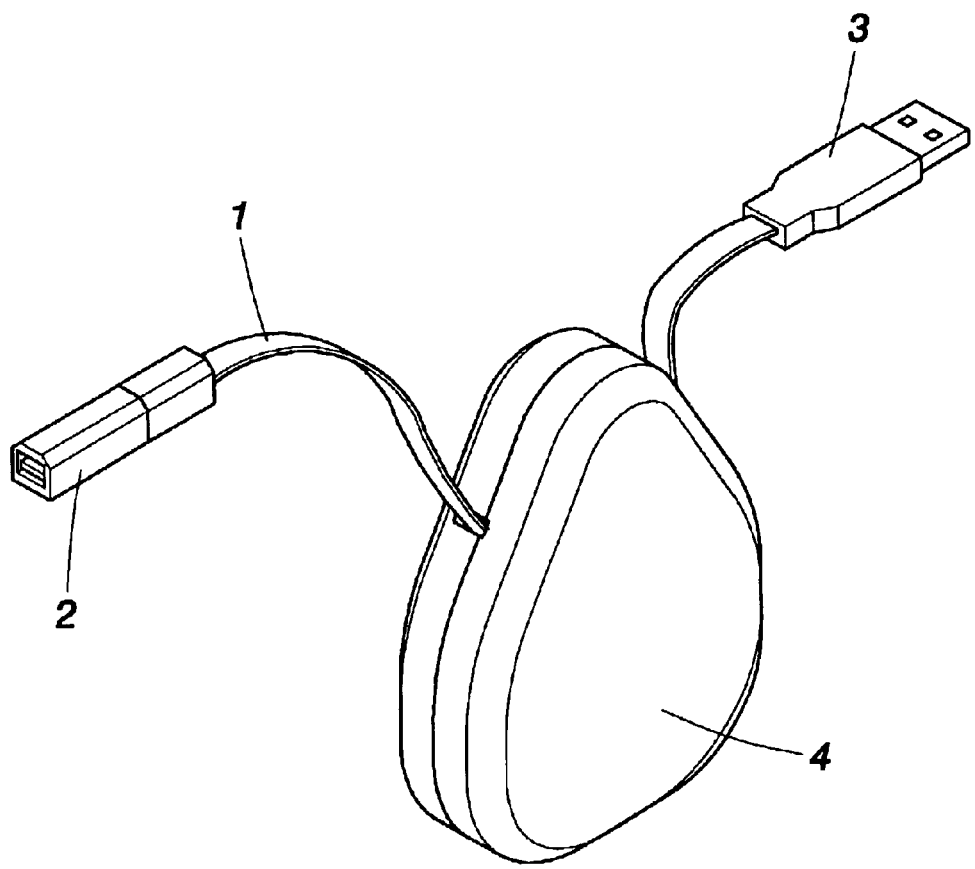
FIG. 6 is a perspective view schematically illustrating an application of the invention.

Referring to FIG. 6, a perspective view schematically illustrates an application of the signal transmission cable according to an embodiment of the invention. The signal transmission cable has two terminal ends connected to a signal plug 2 and a USB connector 3. The signal transmission cable can be further wound and received within a cable-receiving case 4 to facilitate its disposition.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A signal transmission cable structure comprising:
    a flexible insulating body having upper and lower sides which are flat and parallel to each other;
    two signal lines and two power lines enclosed in the flexible insulating body in a plane parallel to said upper and lower sides;
    two first insulating layers respectively surrounding exteriors of the two signal lines;
    two second insulating layers respectively surrounding exteriors of the two power lines;
    a tin foil layer surrounding the first insulating layers; and
    a braid layer surrounding the tin foil layer.

2. The cable structure of claim 1, wherein the insulating body is made of polyvinylchloride having good thermosetting properties.

3. The cable structure of claim 1, wherein two terminal ends of the signal transmission cable are respectively connected to a plug so that the signal transmission cable is wound in a cable-receiving case.

4. The cable structure of claim 1, wherein the two power lines are respectively placed at two sides of each of the two signal.

5. The cable structure of claim 1, wherein the two power lines are placed at a same side of the two signal lines.

6. The cable structure of claim 1, wherein a spacing distance between the two second insulating layers and the braid layer on the two signal lines is about 0.2 to 0.9 mm.

7. The cable structure of claim 1, wherein a width of the signal transmission cable is about 4.5 to 8 mm.

8. The cable structure of claim 1, wherein the two first and second insulating layers are made of foam polyethyl.

* * * * *